June 3, 1924.
J. H. RIDDICK
PROCESS OF TREATING HYDROCARBONS
Filed April 19, 1919
1,496,742
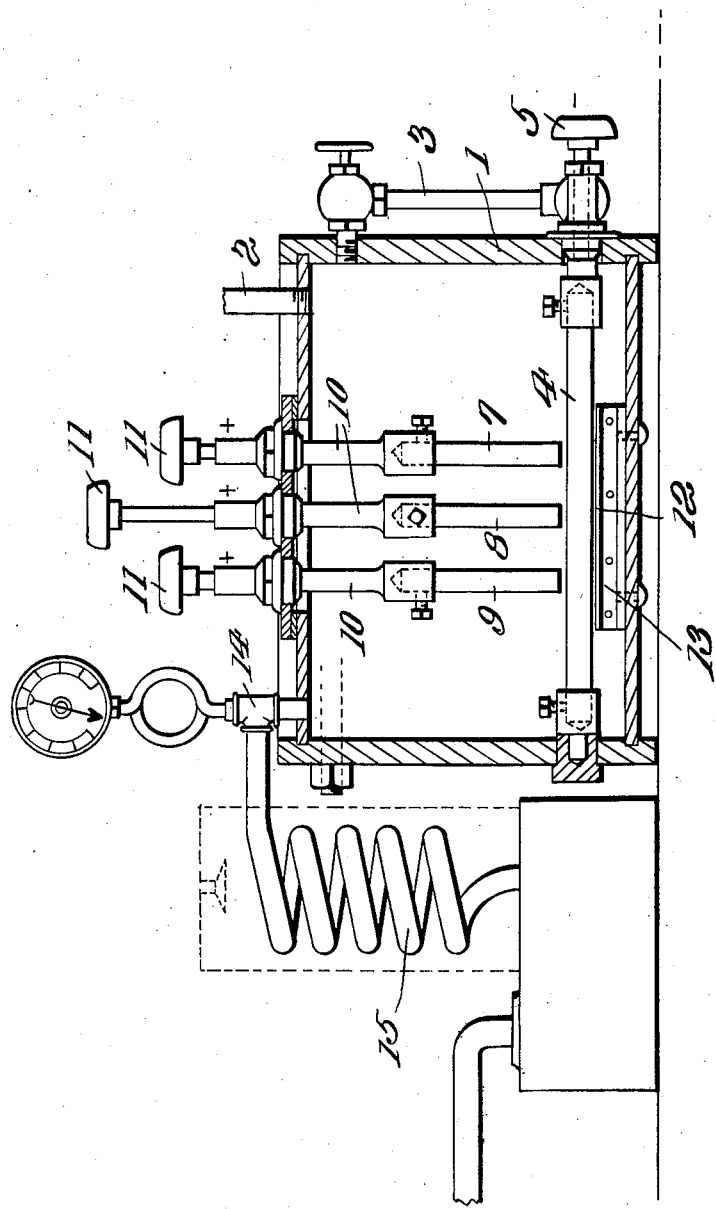

Patented June 3, 1924.

1,496,742

UNITED STATES PATENT OFFICE.

JOSEPH H. RIDDICK, OF LYNCHBURG, VIRGINIA.

PROCESS OF TREATING HYDROCARBONS.

Application filed April 19, 1919. Serial No. 291,191.

*To all whom it may concern:*

Be it known that I, JOSEPH H. RIDDICK, a citizen of the United States, residing at Lynchburg, in the county of Campbell, State of Virginia, have invented certain new and useful Improvements in Processes of Treating Hydrocarbons, of which the following is a description, reference being had to the accompanying drawing, and to the figures of reference marked thereon.

The invention relates to new and useful improvements in processes of treating liquid hydrocarbons, and more particularly to a process which results in a molecular rearrangement in the hydrocarbon liquid.

The specific object of the invention is to provide a process of treating kerosene, which results in the formation of ethylene gas and valuable lighter oils.

The broader object of the invention is to provide a process of treating liquid hydrocarbons, such as crude oil, kerosene, gas house oils and the like, so as to cause elementary carbon to be freed therefrom and gases and lighter oils formed, which gases and lighter oils may be collected without serious admixture of distillates from the original hydrocarbon liquid.

A further object of the invention is to provide a process of establishing and maintaining an electric arc submerged in a liquid hydrocarbon, whereby a continuous chemical disassociation is caused to take place in the liquid hydrocarbon.

These and other objects will in part be obvious and will in part be hereinafter more fully disclosed.

In the drawings—

The figure is a sectional view through one form of apparatus which may be used in carrying out the invention.

The specific improvement to which my invention relates consists in the treating of kerosene so as to form therefrom ethylene gas and lighter oils, somewhat of the nature of gasolene, the primary purpose, however, being the formation of the ethylene gas.

The process consists in establishing and maintaining an electric arc within the liquid kerosene and at some distance beneath the surface thereof, so that said arc is completely submerged within the kerosene. This established electric arc causes a molecular rearrangement within the kerosene, free elementary carbon is produced, ethylene gas is formed and certain lighter oils, which may be vaporized by the arc and pass over with the ethylene gas, and also to a certain extent heavier oils which remain in the receptacle where the process is carried out. The ethylene gas formed through the action of the electric arc on the kerosene forms a gas pocket about the arc and the process of chemical disassociation takes place within the region of this pocket. The gas as it accumulates at the arc escapes and bubbles up through the liquid kerosene into the receptacle above the surface of the kerosene and is then carried off through a suitable pipe, said pipe leading to a condenser wherein the lighter oils which are formed by the chemical disassociation of the kerosene are condensed and may be collected, the ethylene gas going on through the condenser to suitable vessels where it may be stored. The free elementary carbon released during the chemical disassociation accumulates on the electrodes forming the electric arc and would tend to build up the electrode and short circuit and destroy the arc, and, therefore, suitable means is necessary to maintain the arc. This may be accomplished by the jarring of the electrodes or the rotating of one or both of the electrodes, so as to prevent the carbon accumulating thereon or by the scraping of the carbon by mechanical means from the electrodes, or by automatically separating the electrodes as the carbon deposit accumulates, so as to maintain the necessary gap to produce the arc.

The broad invention consists in the treating of liquid hydrocarbons of which kerosene is merely an example in the manner above described by establishing and maintaining an electric arc wholly within the body of the liquid hydrocarbon, said arc causing a molecular rearrangement of the liquid hydrocarbon, bringing about chemical disassociation, thus forming gases and lighter oils, and also, possibly, a chemical association forming heavier oils. The gases and certain of the oils being vaporized by the arc pass to the surface of the liquid and may be taken off through a suitable condenser where the oils are collected and the gases passing on to a suitable storage receptacle.

The invention may possibly be better understood by a brief reference to the drawing which shows one form of apparatus which may be utilized in carrying out the process. Said apparatus consists of a receptacle 1, which is provided with an inlet pipe 2, through which the liquid hydrocarbon is supplied. A suitable gauge 3 is connected with the receptacle, by which the level of the liquid in the receptacle may be noted. Disposed within the receptacle is an electrode 4. This electrode is mounted in suitable bearings adjacent the lower part of the receptacle, and a shaft connected thereto extends outwardly through the wall of the receptacle and is provided with a suitable handle 5, by which said electrode may be rotated. Extending downwardly into the receptacle are three electrodes 7, 8 and 9. Each of these electrodes is carried by a shaft, indicated at 10, which extends through the top of the receptacle and each shaft is provided with a suitable handle 11, whereby it may be rotated. Suitable means is provided so that by rotating any one of the shafts 10, the electrodes may be raised or lowered. The lower ends of the electrodes 7, 8 and 9 are disposed adjacent the electrode 4. The electrodes are connected with a suitable source of current, which may be an alternating current or a direct current, of sufficient voltage and amperage to establish an arc within the liquid hydrocarbon. There will be an arc formed between each of the electrodes 7, 8 and 9 and the electrode 4. So far as the process is concerned, there may be one arc or more arcs, the number of arcs has more to do with the process from a commercial aspect.

Located directly beneath the electrode 4 is a knife blade 12, which is carried by a suitable supporting bracket 13. Connected with the upper part of the receptacle is a pipe 14, through which the gases and lighter oils which are formed and vaporized by the electric arc pass. The pipe 14 leads to a condenser 15, in which the lighter oils are condensed and collected in a suitable receptacle therefor, while the gas passes on through said condenser to a suitable vessel (not shown) where-it may be stored.

The purpose of rotating the electrode 4 is to prevent the accumulation of free carbon thereon in the carrying out of the process and if said carbon accumulates to any extent, it will be moved from the electrode by the knife blade 12.

In the carrying out of the specific form of the invention, above referred to, the receptacle is supplied with kerosene, so that the level of the liquid in the receptacle is well above the ends of the electrodes 7, 8 and 9, so that the arcs formed by these electrodes, in conjunction with the electrode 4, are all buried or well submerged within the liquid kerosene. Suitable current is supplied to the arcs, as above noted, and the process at once causes the formation of ethylene gas at the electrodes, which forms a gas pocket about the electric arc, and the process is really carried out in the region of this gas pocket. As the gas continues to be formed, it will break away from the electrodes, bubble to the surface of the kerosene, pass off through the pipe 14, through the condenser to the storage vessel therefor.

In the treating of kerosene, as above noted, the gas which is formed through the molecular rearrangement or chemical disassociation by the action of the electric arc, is ethylene gas ($C_2H_4$). At the same time free elementary carbon is formed which has a tendency to accumulate on one or the other or both electrodes, but this carbon is either removed through the rotating of one of the electrodes, the jarring of the electrodes, or by other means, the electrodes are separated, so as to maintain the air gap, or in any other way manipulated so as to maintain the arc and thus cause the process to be continuous. Without some means of maintaining the arc, the free graphitic carbon would almost instantly close the gap between the electrodes, so as to put out the arc and stop the process. As the process goes on and the kerosene is formed into ethylene gas and lighter oils, it leaves a residue, a more or less heavy oil, which may be removed from time to time. In order to remove the heavy oils, the apparatus is stopped, the lighter oils drawn off, and thus the heavy oils may be obtained. As the kerosene is consumed through the continued action of the process, additional kerosene is supplied in the manner above stated.

In the carrying out of the broader process, the liquid hydrocarbon, such as a crude oil, gas house oils, or any other form of liquid hydrocarbon, is placed in the receptacle, the electric arc established and maintained, and through the action of the electric arc a chemical disassociation or molecular rearrangement will take place within the liquid hydrocarbon in the region of the arc and the gases and lighter oils formed thereby may be passed through a condenser, the lighter oils collected therein, and the gas passed on to a suitable storage receptacle.

From the above, it will be apparent that the essential features of my invention, from a broad aspect, consist in the establishing and maintaining of an electric arc within the liquid body of a liquid hydrocarbon and through this established arc a continuous reaction is set up in the liquid hydrocarbon resulting in a chemical disassociation and a chemical association, and through this action valuable gases and lighter oils are formed from the hydrocarbon and heavy oils reclaimed as a residue.

In the more specific embodiment of the invention, the process is applied to the treatment of kerosene for the principal purpose of forming and recovering ethylene gas, although during the carrying out of this process valuable lighter oils will be formed, vaporized and carried over with the gas, which oils may be collected and subjected to distillation processes.

Having thus described my invention, what I claim as new and desire to secure by Letters Patent, is:

1. The process of treating kerosene for forming ethylene gas therefrom, which consists in subjecting the kerosene to an electric arc submerged within the kerosene, and mechanically operating upon the electrodes forming the arc for preventing the accumulation of elementary carbon thereon freed from the kerosene through the action of the electric arc thereon, and thereby maintaining the arc and causing a continuous disassociation to take place forming and liberating ethylene gas.

2. The process of treating liquid hydrocarbons, which consists in subjecting the hydrocarbon to an electric arc submerged within the hydrocarbon, mechanically operating upon the electrodes forming the arc for preventing the accumulation of elementary carbon thereon freed from the liquid hydrocarbon through the action of the electric arc thereon.

In testimony whereof, I affix my signature, in the presence of two witnesses.

JOSEPH H. RIDDICK.

Witnesses:
JAS. R. CASKIN,
JNO. L. LEE.